United States Patent [19]

Cartmell et al.

[11] Patent Number: 4,485,966
[45] Date of Patent: Dec. 4, 1984

[54] PULSATION DEVICE FOR A HEATING OR COOLING UNIT

[76] Inventors: Robert L. Cartmell, 2905 California, Dayton, Ohio 45419; Cletus F. Berning, 5499 Woodbridge La., Dayton, Ohio 45429

[21] Appl. No.: 468,080

[22] Filed: Feb. 22, 1983

Related U.S. Application Data

[63] Continuation-in-part of Ser. No. 221,000, Dec. 19, 1980, abandoned.

[51] Int. Cl.³ .................... F25B 19/00; F23N 5/20
[52] U.S. Cl. ................................. 236/46 R; 62/231
[58] Field of Search ............... 165/12; 62/231; 236/46 R, 46 F, 10

[56] References Cited

U.S. PATENT DOCUMENTS

| | | | |
|---|---|---|---|
| 4,027,171 | 5/1977 | Browder et al. | 236/46 R |
| 4,136,730 | 1/1979 | Kinsey | 165/12 |
| 4,154,397 | 5/1979 | Carlson | 236/46 R |
| 4,191,328 | 3/1980 | Isaacs et al. | 236/46 R |
| 4,197,992 | 4/1980 | Klebanoff | 236/47 |
| 4,199,023 | 4/1980 | Phillips | 165/12 |
| 4,333,519 | 6/1982 | Shafrir et al. | 165/27 X |
| 4,423,765 | 1/1984 | Hildebrand | 165/12 |

Primary Examiner—William E. Wayner
Attorney, Agent, or Firm—Jacox & Meckstroth

[57] ABSTRACT

A heating system, such as a gas fired or oil fired furnace, is operated by a control system which includes a low voltage AC power supply, a low voltage thermostat for sensing the temperature in the space to be heated and a solenoid controlled relay or fuel supply valve. The control system also includes a low voltage pulsation device which is connected in series with the thermostat and solenoid and is effective, when the thermostat closes, to pulsate or cycle the solenoid causing the heating unit to be turned on and off for supplying heat in increments to the heat exchanger within the furnace. The pulsation device is adapted to be quickly and easily installed in the low voltage control circuit for the heating unit or for a cooling unit.

11 Claims, 7 Drawing Figures

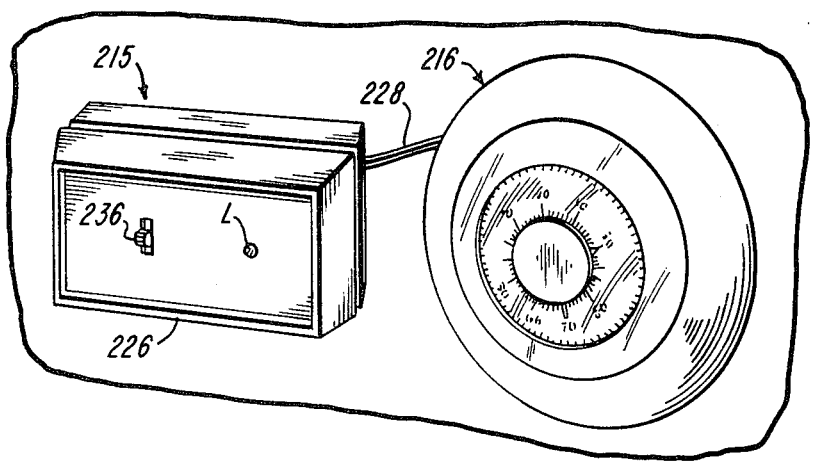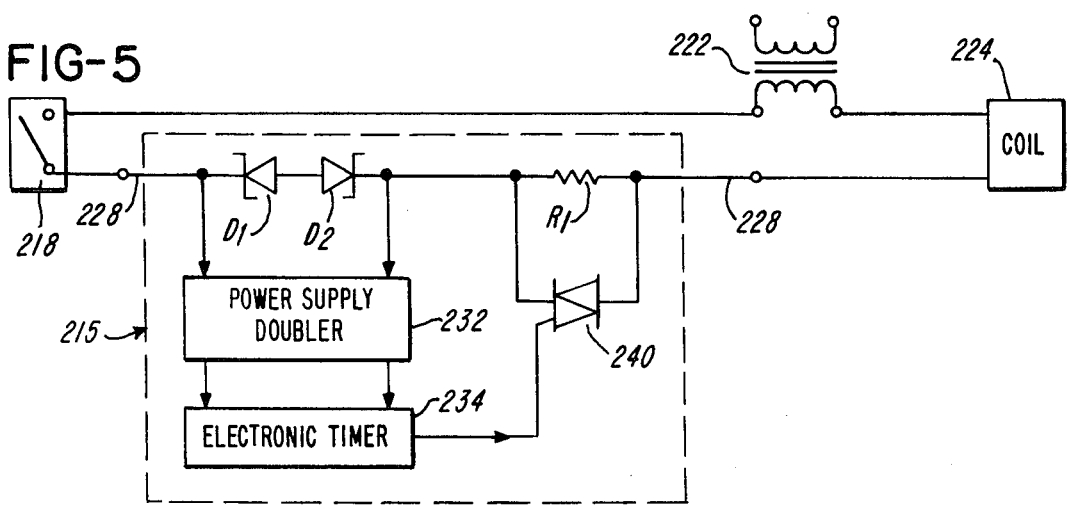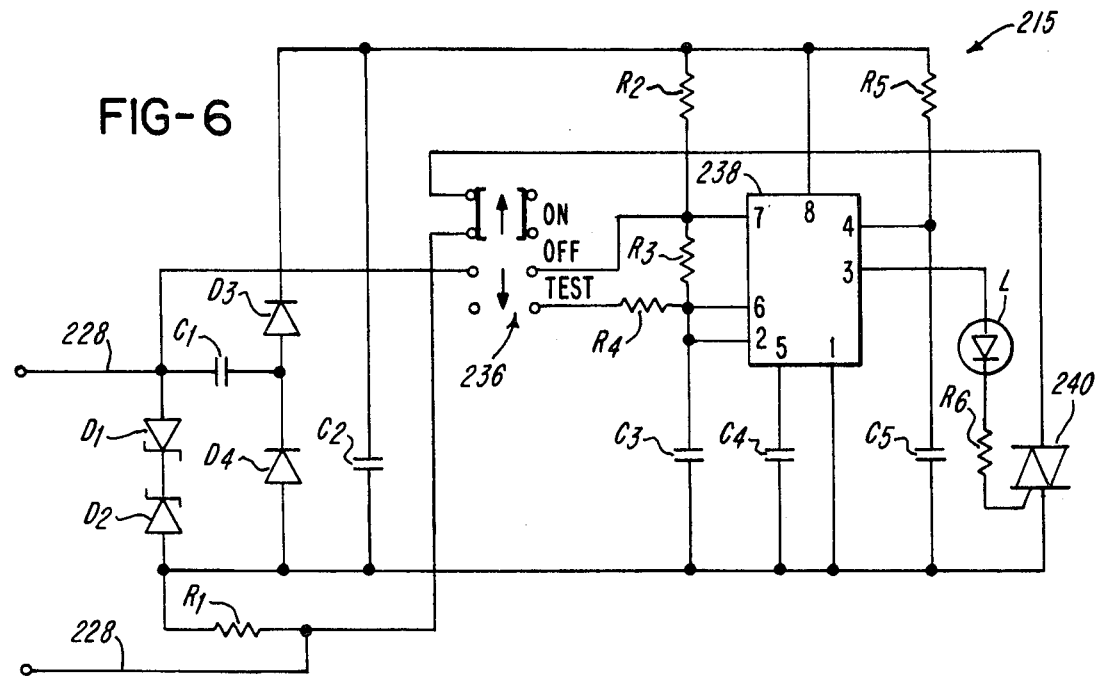

PULSATION DEVICE FOR A HEATING OR COOLING UNIT

RELATED APPLICATION

This application is a continuation-in-part of U.S. application Ser. No. 221,000, filed Dec. 29, 1980, now abandoned.

BACKGROUND OF THE INVENTION

This invention relates to control devices for a heating or air conditioning system, and more particularly to control devices for cycling or pulsating the heating or cooling units to obtain more efficient operation of the system.

In automatic heating systems, it is customary to provide a heating control system which comprises a thermally responsive device, such as bimetallic thermostat, in the space to be heated, and associated with such thermostat, means for operating the heater controls. The heater controls are ordinarily removed from the space to be heated, and the bimetallic thermostat, which is a relatively delicate instrument with low power, ordinarily operates the remotely located heater controls via an electrical connection.

The bimetallic thermostat is generally connected in a series arrangement with a low-voltage power source and an actuating device for operating the heater controls. The bimetallic thermostat generally consists of a switch actuated by a bimetallic metal. When the space to be heated is at or above the desired temperature setting (i.e., the temperature set on the bimetallic thermostat), the bimetallic thermostat is open rendering the heater non-operative. When the temperature in the space to be heated falls below the desired temperature, the bimetallic thermostat closes activating the heater control, which in turn activates the heater, thereby supplying heat to the space to be heated.

In order to maintain an even temperature in the space to be heated, it is desirable that the bimetallic thermostat respond quickly to temperature changes. However, because of the many thermal characteristics of the heating system, including the thermal time constant of the thermostat, the thermostats of the present art do not respond quickly enough, thereby causing room temperatures to overshoot or go higher than the setting of the bimetallic thermostat before the bimetallic thermostat opens deactivating the heater controls.

The bimetallic thermostats of the present art are two-position control devices, i.e., the control causes the burner to be full-on or full-off. One of the difficulties with a two-position control is that frequently the control keeps the heater activated for too long a time. Consider a house which utilizes hot-water radiation heat. When the space to be heated is below the bimetallic thermostat setting, the heater is activated (by the closure of the bimetallic thermostat), heating the water which will rise by convection to displace the colder water in the radiators. The bimetallic thermostat will keep the heater going until the bimetallic thermostat senses the desired temperature setting. At this point, the bimetallic thermostat opens causing the heater to deactivate, i.e., shut-down. However, the thermal mass residual in the heating system, which has been activated full-on up to the point in which the bimetallic thermostat opens, is enough to cause the heat output into the space to be heated to continue beyond the setting of the bimetallic thermostat, and some temperature overshoot of the space to be heated will occur. This is easily understood when the mass of the radiators is considered, how warm they get, and how long it takes for the radiators to dissipate their heat once the heater is shut down.

To compensate for the temperature overshoot, two-position control devices including the bimetallic thermostat of the present art, frequently incorporate an anticipator which, upon the closure of the bimetallic thermostat contacts, applies false heat to the bimetallic thermostat causing the heater to shut-down prematurely, i.e., the temperature in the space to be heated has not reached the desired temperature setting. This premature shut-down allows the heating system to take advantage of the heating system's thermal characteristics (i.e., the thermal time constants) and permit the temperature in the space to be heated to rise more gradually to the thermostat temperature setting before reactivating the heater. Present art heat anticipators are made of resistance type material that produces heat in accordance with the current drawn through them. Heat anticipators of the present art are adjustable and are normally set to correspond with the current rating of the main gas valve, thereby essentially ignoring the thermal characteristics of the space to be heated.

The phenomenon of thermal mass or thermal time constants can be explained by the act of attempting to boil water utilizing an electric stove. The burner is turned on and the electric energy supplied to the burner is transferred to the water. When the water boils, the pot is removed from the burner, the water temperature having reached the desired temperature, and the burner is turned off. However, it will be observed that the burner is still glowing cherry red and the residual heat in the burner element will now be transferred to the room and not be utilized for heating the water. If the burner had been turned off slightly before the water started to boil, the burner would have remained cherry red for a period of time and, during this period of time, the residual heat in the burner would have gone into heating the water causing the water to boil as before but results in a savings of electrical energy supplied to the burner.

The present invention provides in the heating control system, a novel operation of the heater control by causing the heater to cycle on and off until the temperature in the space to be heated has reached the desired temperature setting. The incremental additions of heat prevent overshoots in the space temperature by taking advantage of the thermal characteristics of the heating system thus resulting in a fuel savings. No adjustment akin to that of present anticipators is necessary in the present invention. By providing an adjustment of the cycle-on and cycle-off time, the present invention is directed towards maximizing the utilization of the thermal characteristics of the heating system.

SUMMARY OF THE INVENTION

The present invention is directed to an improved device for use with the controls for a heating or cooling system, and more specifically to a simplified device adapted to be quickly connected to the controls for pulsating or cycling the heating or cooling unit. In such a control system, a thermostat senses the temperature in the sapce to be heated or cooled and controls the operation of a solenoid or relay which activates the heater or cooling unit. The thermostat and solenoid or relay are connected in a series arrangement with a low voltage power source, and the pulsation device of the invention also connects in the series arrangement to cause the heater or cooling unit to be cycled on and off thereby supplying or extracting heat energy incrementally to or from the heat exchanger.

The device of the invention is operative during the time the thermosat senses that heat is required to be added or removed from the space and incorporates a circuit having a low voltage controlled switch with a control terminal and a timer circuit for generating a control voltage. The control voltage has a high state and a low state corresponding to the cycle-on and cycle-off, respectively, and causes the voltage controlled switch to be alternately in opened and closed conditions. The timer circuit is operated from a small voltage power supply obtained from the low voltage circuit.

Other features and advantages of the invention will be apparent from the following description, the accompanying drawing(s) and the appended claims.

BRIEF DESCRIPTION OF THE DRAWINGS

FIG. 4 is a perspective view of a pulsation device constructed in accordance with another embodiment of the invention and shown mounted on a wall next to a thermostat;

FIG. 5 is a block diagram of the pulsation device shown in FIG. 4 and illustrating its installation in the control circuit for a heating unit; and FIG. 6 is a schematic diagram of the pulsation device shown in FIG. 5.

DETAILED DESCRIPTION

Figure 1A:
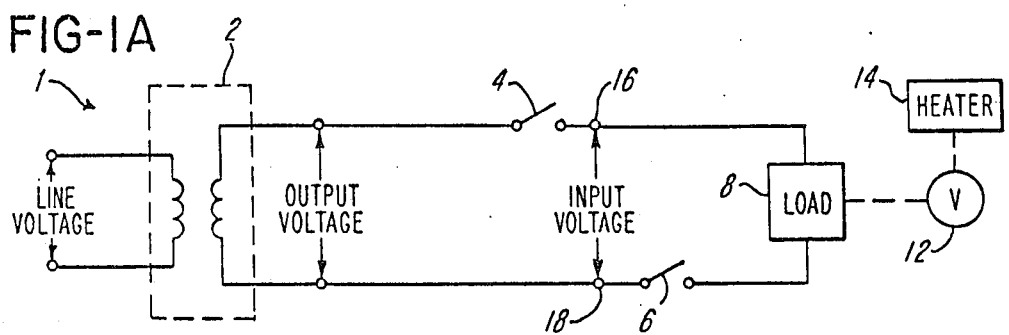
FIG. 1A shows a general schematic of a heating control system of the present invention.

FIG. 1A shows a heating control system 1 of the present invention. The heating control system 1, also referred to herein as a series connected circuit 1, comprises a transformer 2, a first switch 4, a second switch 6, and a load 8 connected in a series arrangement. The transformer 2 has an input to the primary winding a line voltage which is generally the normal household voltage of 115 volts, 60 cycle AC (alternating current), and the output of the secondary windings of transformer 2 is, in the preferred embodiment, an output voltage of 24 volts AC, the low voltage being desirable for various safety reasons. Switch 4 (the bimetallic thermostat 4 or also referred to herein simply as thermostat 4) is placed in the room or space to be heated. Switch 6 depicts a timer which causes the heater to be cycled on and off alternately when thermostat 4 is closed. Connected in series with the secondary windings of transformer 2 and the bimetallic thermostat 4 is the load 8. Load 8 may be a solenoid, a relay, or other control actuating means for activating the heater controls 12. The heater controls 12 may be a gas valve as shown or an oil pump or other heater control apparatus. Also shown in FIG. 1A is the burner or heater 14 controlled by heater controls 12. The elements of the series circuit described thus far from a heating control system such as, for example, as used on a forced air gas furnace for a home. The heater controls 12 and heater 14 show the integration of the heating control system in a heating system and will not be discussed further herein since they are not necessary for an understanding of the present invention.

Included in FIG. 1A is the second switch 6 connected in series with the aforementioned elements. Switch 6, as mentioned above, depicts a timer which causes the heater 14 to be cycled on and off after the thermostat 4 closes. Cyclically activating the heater on and off causes the room temperature to be brought up by increments rather than in a single step, avoiding an overshoot in the temperature of the space to be heated by taking advantage of the thermal characteristics of the heating system, including the thermal characteristics of the space to be heated.

Figure 1B:
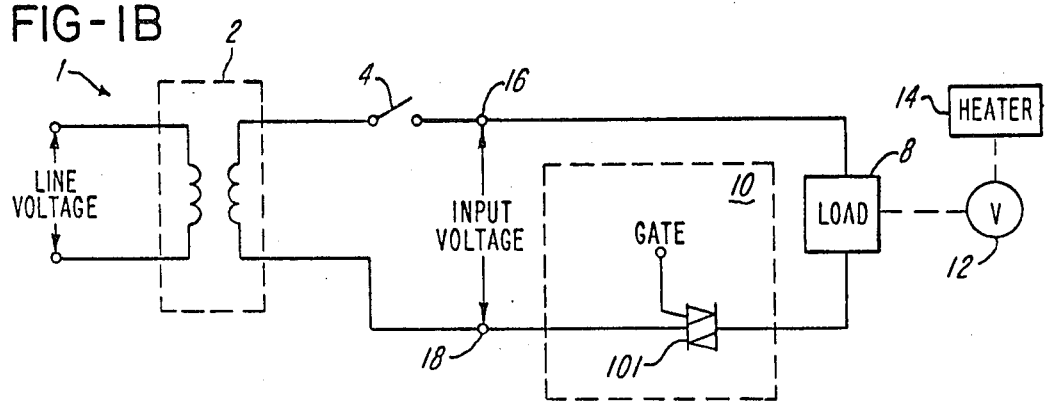
FIG. 1B shows a general schematic of a heating control system of the present invention with the second switch means of FIG. 1A replaced by an equivalent circuit component.

FIG. 1B shows the circuit of FIG. 1A with switch 6 being replaced by a triac 101 in a practical application of the present invention. Switch 6 operates only after the bimetallic thermostat 4 closes, (i.e., the space to be heated calling for heat). Once the bimetallic thermostat 4 closes, the switch 6 begins its cycling operation until the space to be heated has reached the desired temperature, whereupon the bimetallic thermostat 4 opens and switch 6 ceased its cycling operation. In FIG. 1B, a circuit 10 comprises the triac 101 which has a gate terminal for controlling the operation of the triac 101, the triac 101 being connected in series with the other elements of the heating control system 1.

When the bimetallic thermostat 4 closes indicating the temperature in the space to be heated has dropped below the desired temperature setting, the series connected circuit 1 is still open by the action of triac 101. The series connected circuit 1 is completed by applying a gate voltage (or control voltage) to the gate terminal causing the triac 101 to conduct, thereby switching to a low impedance state and causing the input voltage to be applied across the load 8 which, in turn, causes the heater controls 12 to activate the heater 14. In this state, triac 101 functionally acts as a closed switch 6.

Figure 2:
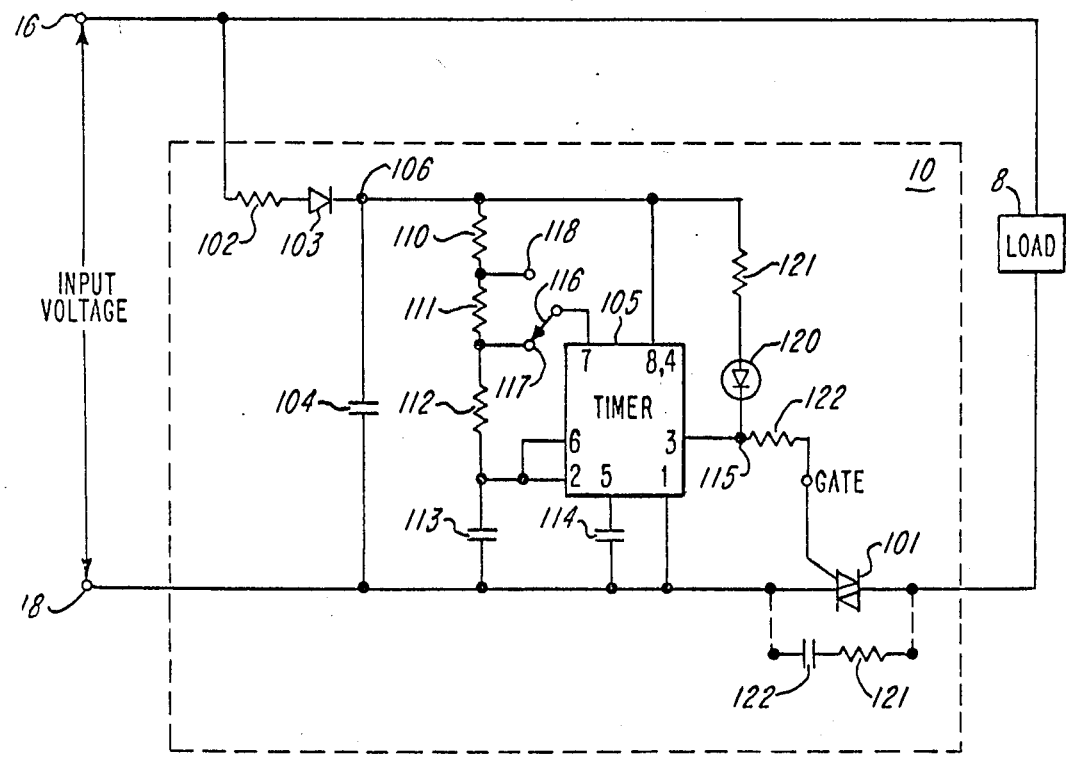
FIG. 2 shows the circuit diagram of the second switch means of the preferred embodiment of the present invention.

The gate voltage is generated by the circuit 10 shown in FIG. 2. In the preferred embodiment, the input voltage applied at terminals 16 and 18 is the low voltage or 24 volts AC mentioned above, when bimetallic thermostat 4 is closed. The input voltage is applied to load 8 only when triac 101 is in a low impedance or conducting state, the state being controlled by the gate voltage being applied to the gate terminal. Circuit 10 operates to cycle the input voltage across load 8, thereby activating the heater controls 12 which, in turn, supplied fuel to the heater 14. Circuit 10 generates the control voltage for the gate terminal of triac 101. When the gate voltage is zero or a low state, the triac 101 is non-conducting or opened and the load 8 is non-operative. When the gate voltage is in a high state, i.e. sufficiently positive (or negative), the triac 101 is in the conducting state.

Resistor 102, diode 103, and capacitor 104 form a DC (Direct current) power supply which generates a DC voltage at junction 106 for timer circuit 105. The timer 105 of the preferred embodiment is a multivibrator circuit which operates in an astable mode. The output voltage of timer 105 at terminal 115 is effectively the gate voltage of triac 101 and determines the time the heater 14 is activated (cycle-on) and the time the heater 14 is deactive (cycle-off).

Switch 116 is provided to allow selection of the cycle-on and cycle-off time of the heater 14. The time in which the gate voltage is high, thereby activating the heater 14, is determined by resistors 110, 111, 112 and capacitor 113. With the switch 116 contacting terminal 117, the cycle-on time and the cycle-off time is determined by:

$$T_{ON}=0.67(R_{110}+R_{111}+R_{112})C$$

$$T_{OFF}=0.67(R_{112})C$$

With switch 116 in the alternate position, i.e., contacting terminal 118, the cycle-on time and the cycle-off time is determined by:

$$T_{ON}=0.67(R_{110}+R_{111}+R_{112})C$$

$$T_{OFF}=0.67(R_{111}+R_{112})C$$

In a typical application, the values of the components are:

$R_{110}=4.7$ M, $R_{102}=470$
$R_{111}=3$ M, $C_{114}=0.01$
$R_{112}=1$ M, $C_{104}=220$ Mf
$C_{113}=25$ Mf, $R_{121}$ & $R_{122}=820$ resulting in an on-off time of approximately 145-15 seconds for the switch 116 in the terminal 117 position and approximately 145-65 seconds for the switch 116 in the terminal 118 position. In the preferred embodiment, timer 105 consists of timer chip 555 made to operate in the astable mode. Additional information regarding the 555 timer operation is available in the Signetics Analog Timer Manual (by Signetics Corporation, 811 East Arques Ave., Sunnvale, California, 94086). Included in circuit 10 is a light emitting diode 120 indicating when the output of the timer 105 is in the low state (or the heater is not activated).

It will be recognized by those skilled in the art that resistor 121 and capacitor 122 may be added across the triac 101 in order to insure proper operation of the traic 101 for inductive loads 8. It will further be recognized by those skilled in the art that the switch 6 (or circuit 10) is particularly suited for quick and convenient installation at the location of the heater controls 12 of an existing furnace, for example, adjacent the low voltage solenoid actuated gas supply valve on an existing gas fired furnace where there is usually available a power supply of low or 24 volt for operating the circuit 10. Further, it will be recognized by those skilled in the art that different types and values of voltages may be used in the heating control system 1, switch 116 positions may be varied to provide a variety of cycle-on and cycle-off selections, different switch 6 types and configurations may be utilized, and different gate control devices 101 may be utilized within the scope of the invention.

Figure 3:
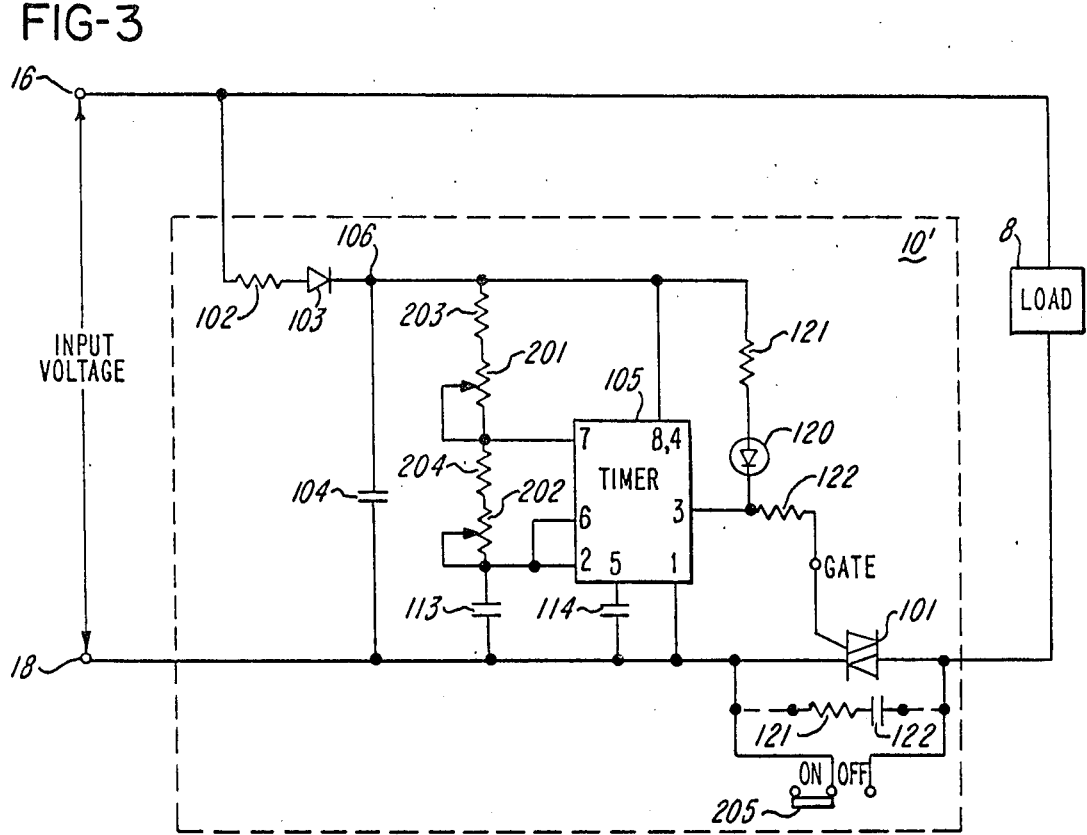
FIG. 3 shows a circuit diagram of an alternative embodiment of the present invention.

A modified embodiment of the circuit 10 of the present invention is shown in FIG. 3. In this embodiment, circuit 10' comprises resistor 102, diode 103, and capacitor 104 for supplying a DC voltage at terminal 106 for timer 105, timer 105 being connected to operate in an astable mode. Potentiometers 201, 202 are configured such that the cycle-on and cycle-off time are variably adjustable through a continuous range of time values, the times being determined by the settings of resistors 201, 202 resistors 203, 204, and capacitor 113 as noted above. The modified embodiment is particularly suited for use in a heating control system 1 for an oil fired furnace. The variable time adjustments allow compensation for time delays present in existing oil fired furnaces, including delays caused by safety devices used for flame failure, ignition failure, etc. A switch 205 is also provided to switch circuit 10' out of the series connected circuit.

Another pulsation device constructed in accordance with the invention is illustrated in FIGS. 4–6. In this embodiment, a pulsation device 215 is mounted on a wall adjacent a thermostat 216 which includes a thermostatic switch 218 (FIG. 5) connected in series with a transformer 222 and a coil 224 for a relay or solenoid actuated gas valve. The pulsation device 215 includes a housing 226 from which extends a pair of wire conductors or leads 228 (FIG. 5) for conveniently connecting the pulsation device 215 in series with the thermostatic switch 218, transformer 222 and coil 224, as shown in FIG. 5.

The pulsation device 215 includes a pair of Zenner diodes D1 and D2 which are connected in series with each other and in series with a resistor R1. Thus the series connected diodes D1 and D2 and resistor R1 are connected by the leads 228 in series with the thermostatic switch 218, transformer 222 and coil 224. As mentioned above, transformer 222 usually produces a voltage of approximately 24 volts AC. However, the coil 224 of practically all commonly used gas valves and relays will operate on a lesser voltage, for example, 21 or 22 volts.

A small voltage power supply is obtained across the series connected diodes D1 and D2, for example, between 2 and 4 volts AC. The small voltage power source supplies a voltage doubler circuit 232 which includes a set of diodes D3 and D4 (FIG. 6) and capacitors C1 and C2. The doubler 232 supplies approximately 6 volts DC to an electronic timer 234 through an on-/off/test switch 236, as shown in FIG. 6. The timer 234 incorporates a circuit which includes an integrated circuit timer 238 which is the same as timer 105 described above in connection with FIGS. 2 and 3. As also discussed above, the on-off or duty cycle of the timer 238 is determined by the values of the RC circuit including the resistors R2 and R3 and a capacitor C3 which are connected to the pins 2, 6 and 7 of the timer 238, as shown in FIG. 6. The pin 6 of the timer 238 is also connected to the test terminal of the switch 236 through a resistor R4, and a capacitor C4 connects with the pin 5. Another resistor R5 and capacitor C5 are connected to pin 4 of the timer 238, and pin 3 of timer 238 is connected through an indicating light L an resistor R6 to the gate of a triac 240, in a manner similar to that described above in connection with the embodiment shown in FIG. 2. That is, when pin 3 is positive, triac 240 is on or conducting, and when pin 3 has a zero voltage, triac 240 is open or non-conducting.

In operation of the pulsating device 215, when the thermostatic switch 218 is closed, a small AC voltage, for example, of 2 to 3 volts, is supplied to the doubler 232 which supplies approximately 6 volts DC to the timer 234. As mentioned above, the on/off cycle of the timer 234 is determined by the values of the resistors R2 and R3 and the capacitor C3. When pin 3 is positive and the triac 240 is conducting, the coil 224 receives a voltage slightly less than 24 volts which is sufficient to open the solenoid or actuate the relay so that fuel is supplied to the burner. When the triac is non-conducting, resistor R1 permits a small current to flow through the diodes D1 and D2 so that the diodes continue to supply a small voltage power supply to the doubler 232 which, in turn, maintains the operation of the timer 234. It has been determined that the small voltage drop across the diodes D1 and D2 does not affect the operation of the solenoid coil 224 by the triac 220 and that the small current flow through the coil 224 as permitted by the resistor R1 is not sufficient to actuate the coil 224 when the triac 240 is open.

In one test program of the pulsation device 215 installed in the control circuit for a gas furnace valve, the values of the resistors and capacitors were as follows:

R1=470 ohms, C1=570 MFD
R2=7.5 M ohms, C2=470 MFD
R3=4.3 M ohms, C3=100 MFD
R4=?C4=0.01 MFD
R5=100 K ohms, C5=25 MFD
R6=820 ohms The above values produced a repetitive cycle time wherein the gas valve was open for approximately two minutes and closed or off for approximately fifty seconds. As mentioned above, the pulsation device 215 may also be used in the control of an oil furnace or an air conditioning unit simply by changing the repetitive on/off cycle by changing the values of the resistors R2 and R3 an capacitor C3. For example, when the pulsation device 215 is used in the control of an oil furnace, the values of R2 and R3 are 5.6 M and 3.6 M ohms, respectively, and the value of capacitor C3 is 47 MFD. This produces a cycle time wherein the fuel oil is supplied for approximately seven minutes and cut off for approximately three minutes. When the device 215 is used in the control of an air conditioning unit or compressor, resistors R2 and R3 may have values of 3.4 and 5.2 mega ohms, respectively, and capacitor C3 has a value of 100 MFD. These values provide for the air conditioning unit or compressor to be on or energized for approximately ten minutes and deenergized or off for approximately four minutes.

From the drawings and the above description, it is apparent that a control circuit using a pulsation device constructed in accordance with the invention, provides desirable features and advantages. For example, the device is effective to decrease or down-size the BTU/hr. input of a gas fired furnace, for example, from 100,000 BTU/hr. to 85,000 BTU/hr. This has been found to provide a fuel savings in the operation of the gas furnace which is usually selected or sized for the coldest day of operation rather than a normal day of operation. The pulsation device 215 disclosed in FIGS. 4–6 is also simple to install since it requires no polarization and no separate power supply excepted for the small voltage power supply which is extracted from the series control circuit. Thus the device 215 may be installed anywhere in the circuit, for example, adjacent the thermostat or adjacent the solenoid coil. The switch 236 also provides for bypassing the pulsation device 215 when the switch is in the "Off" position and for testing the operation of the timer circuit when the switch is in the "Test" position.

While the above description is primarily directed to the use of the pulsation device of the invention in the control of a gas valve for a gas heating system, it will be appreciated by those skilled in the art that the pulsation device is not limited to such use and may be used in the control of other heating and cooling systems. Furthermore, while there has been shown what is considered to be the preferred embodiments of the invention, it will be apparent that changes and modifications may be made therein without departing from the essential spirit and scope of the invention. It is intended, therefore, in the annexed claims, to cover all such changes and modifications which fall within the true scope of this invention.

The invention having been described, the following is claimed:

1. A pulsation device adapted for use in a circuit including a thermostatic switch connected in series with a low voltage alternating current power supply and a control unit for a heating or cooling system, said pulsation device comprising means connected in series with said thermostatic switch and said control unit for producing a direct current power supply substantially lower than said alternating current power supply, a pulsating switch connected to conduct a substantial portion of the current directed through said thermostatic switch and said control unit, timer means operated by said direct current power supply and programmed to open and close said pulsation switch according to corresponding predetermined time periods in response to operation of said timer means, and means connected to said pulsation switch for providing a small current flow through said control unit and said means for producing said direct current power supply when said pulsation switch is open and said thermostatic switch is closed to maintain operation of said timer means without actuating said control unit.

2. A pulsation device as defined in claim 1 wherein said pulsation switch comprises a triac.

3. A pulsation device as defined in claim 2 and including an indicating light connected to be energized when said pulsation switch is closed and conducting.

4. A pulsation device as defined in claim 1 and including a test switch connected to said timer means for checking the operation of said pulsation switch.

5. A pulsation device as defined in claim 1 and including a housing adapted to be mounted on a wall adjacent the thermostatic switch and enclosing said direct current power supply means, said pulsation switch, said timer means and said means for providing a small current flow.

6. A pulsation device as defined in claim 5 wherein said means for connecting said direct current power supply means in the circuit include a pair of flexible lead wires extending from said housing for conveniently and quickly connecting said pulsation device in series with the thermostatic switch.

7. A pulsation device as defined in claim 1 wherein said means for producing said direct current power supply comprise a set of Zenner diodes connected in series.

8. A pulsation device as defined in claim 7 and further including a power amplifier connected between said diodes and said timer means.

9. A pulsation device adapted for use in a circuit including a thermostatic switch connected in series with a low voltage alternating current power supply and a control unit for a heating or cooling system, said pulsation device comprising means including a set of diodes connected in series with said thermostatic switch and said control unit for producing a direct current power supply substantially lower than said alternating current power supply, swith means including a triac having an open position and a closed position and connected to conduct a substantial portion of the current directed through said thermostatic switch and said control unit when said triac is in said closed position, timer means operated by said direct current power supply and programmed to operate said triac between said open and closed positions according to corresponding predetermined time periods in response to operation of said timer means, and resistor means connected in parallel with said triac for providing a small current flow through said control unit and said diodes when said triac is in said open position and said thermostatic switch is closed to maintain operation of said timer means without actuating said control unit.

10. A pulsation device as defined in claim 9 wherein said direct current power supply means further include a power supply amplifier connected between said diodes and said timer.

11. A pulsation device as defined in claim 9 and including a housing adapted to be mounted on a wall adjacent the thermostatic switch and enclosing said direct current power supply means, said triac, said timer and said resistor means.

* * * * *

UNITED STATES PATENT AND TRADEMARK OFFICE
CERTIFICATE OF CORRECTION

PATENT NO. : 4,485,966
DATED : December 4, 1984
INVENTOR(S) : Robert L. Cartmell and Cletus F. Berning It is certified that error appears in the above-identified patent and that said Letters Patent are hereby corrected as shown below:

Column 6, line 48, cancel "an" (second occurrence) and insert -- and --.

In The Claims

Column 8, line 28, cancel "2" and insert -- 1 --.

Signed and Sealed this

*Twenty-third* Day of *April 1985*

[SEAL]

*Attest:*

DONALD J. QUIGG

*Attesting Officer*   *Acting Commissioner of Patents and Trademarks*